Patented Oct. 28, 1952

2,615,890

UNITED STATES PATENT OFFICE 2,615,890

PROCESS OF PREPARING PTERIDINE DERIVATIVES

Angela A. Goldman, River Edge, N. J., and Coy W. Waller, Nanuet, N. Y., assignors to American Cyanamid Company, New York, N. Y., a corporation of Maine No Drawing. Application January 11, 1951, Serial No. 205,611

9 Claims. (Cl. 260—251.5)

1

This invention relates to a new method of preparing substituted pteridines. More particularly, it relates to the preparation of pteridines having a side chain in the 6-position.

The group of compounds generically known as pteridines has recently become of considerable importance because of the fact that certain members possess useful therapeutic properties. The most widely known and used member of this class is folic acid, also known chemically as pteroylglutamic acid. This compound has been found to be useful in the treatment of macrocytic anemias, sprue and other related diseases of the circulatory system.

The chemical structure of pteroylglutamic acid and methods of synthesizing it were first disclosed by the present inventors and co-workers in Science, vol. 103, May 31, 1946. As disclosed there and in later publications other related pteridines can be prepared by similar methods and some of these compounds also possess biological activity.

The new process of the present invention may be carried out by reacting the perbromide of a 2 - acylamino - 4-hydroxy - 6-methyl pteridine with an aminobenzoic acid or one of its amides. The reaction may be illustrated by the following equation:

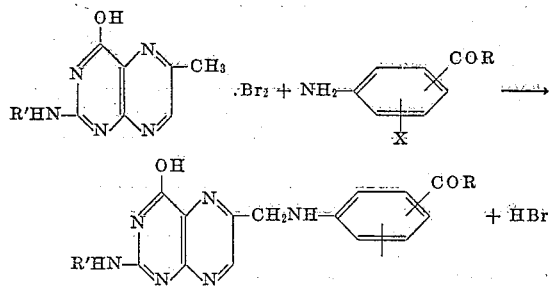

In these formulas R' represents an acyl radical, X represents hydrogen or a hydroxyl radical and R represents an —OH group or an amide radical such as NHR'' in which R'' is hydrogen or an aliphatic radical.

The first intermediate, namely, the perbromide of 2-acylamino-4-hydroxy-6-methyl pteridines, are new compounds which are described and claimed in our co-pending application, Serial Number 205,612, filed January 11, 1951. A method of preparing these compounds is included in the examples hereinafter. The intermediates are preferably prepared by starting with 2-amino-4-hydroxy-6-methyl pteridine, the preparation of which is described in U. S.

2

Patent 2,477,426. This compound is acrylated and then heated in a solvent such as glacial acetic acid with bromine. The product obtained is not a compound in which one or more of the hydrogens of the methyl has been replaced with bromine as would be expected, but is a perbromide. This is known to be a fact because the product obtained under these conditions differs in color from the 6-bromomethyl pterins and the compounds can be made to lose their loosely held bromine which is typical of perbromides. The preferred intermediate is the perbomide of 2 - acetylamino - 4-hydroxy-6-methyl pteridine, however, obviously we can use other intermediates in which the acetyl group of the above compound is replaced with other acyl radicals such as propionyl, butyryl, nicotinyl and the like.

The carbonyl radical with its substituent R may be located at any position on the benzene ring with respect to the amino group although it is preferred that it be in the para-position. Para-aminobenzoic acid or any of its amides may be used in the process. As disclosed in the examples hereinafter, there may be other groups such as a hydroxyl radical on the benzene ring. The preferred amides are those of the amino acids in that the final products prossess the most useful biological properties when this is so. The preferred amino acid amide is that of glutamic acid although other amino acid amides such as those of glycine, aspartic acid, leucine, alanine, isovaline, cysteine, and the like with aminobenzoic acid may be used. The group R may also represent an amino radical having one or more peptide linkages such as glutamylglutamic, diglutamylglutamic, glutamyl glyceryl glutamic and the like. The salts and esters of these amino acid amides may also be used in the process.

The reaction conditions may vary considerably, particularly as to hydrogen ion concentration. When the reaction is carried out at a pH of 3–4 or up to about 11, the desired product is obtained. The temperature of the reaction may vary from about 0° C. up to about 100° C.

The reaction is preferably carried out in an aqueous solution, however, this solution may contain small amounts of other water miscible solvents and also buffering agents such as sodium hydroxide, potassium hydroxide, sodium acetate, etc.

The product obtained in the process of the present invention is the 2-acylaminopteridine, however, the acyl radical can be removed by heating the 2-acrylaminopteridine at steam bath temperatures in 2-3 N hydrochloric acid or allowing to stand in 0.1 N sodium hydroxide solution, usually at room temperature.

The process will now be illustrated in greater detail by means of the following examples which illustrate the reaction of the perbromide of a 2-acylamino-4-hydroxy-6-methyl pteridine with the other intermediates under various conditions.

*Example 1*

Ten grams of 2-amino-4-hydroxy-6-methylpterin is refluxed in one liter of acetic anhydride for about 4.5 hours and left standing at room temperature overnight. A fine crystalline precipitate separates from the solution along with some brown insoluble material. Therefore the whole mixture is again heated to reflux where the crystalline material goes into solution and the brown insoluble material is filtered from the hot solution. On cooling, fine orange needles are precipitated from the solution. These are filtered off, washed twice with water, acetone and ether. The yield of 2-acetamino-4-hydroxy-6-methylpterin is 6.3 g. or 51%. The filtrate from this first crop of acetylated product, on standing, yields a second crop of material weighing 1.9 g. The first crop of acetylated material 6.3 g. is recrystallized five times from hot glacial acetic acid. Each recrystallization removes some coloration so that after five recrystallizations the 2-acetamino-4-hydroxy-6-methylpteridine is almost white.

Forty-six grams of twice recrystallized 2-acetamino-4-hydroxy-6-methylpteridine is dissolved in 1400 ml. of preheated (95° C.) glacial acetic acid. As soon as the pterin dissolves, 11.5 ml. of bromine is added all at once. The reaction is carried out under photoflood light and the temperature of the reaction mixture is maintained at 84° C. After the whole is stirred about 3–5 minutes, a deep red precipitate starts to separate from the solution. The reaction mixture is stirred under light for about 1.5 hours. At the end of this time the deep red precipitate is filtered off, washed with acetic acid and ether and dried. The yield of the perbromide of 2-acetamino-4-hydroxy-6-methylpteridine, is 53 g. or 66.5%.

One-half a gram of the perbromide of 2-acetamino-4-hydroxy-6-methylpteridine is added in small amounts to a vigorously stirred solution of 2.4 g. of para-aminobenzoylglutamic acid in 60 ml. of water maintained at pH 11. The addition of the perbromide requires only five minutes. The reaction mixture is stirred at room temperature for one hour during which time the pH is held at 10–11 by addition, as necessary, of sodium hydroxide solution. At the end of this time the clear solution is acidified to pH 3.5 with hydrochloric acid and a yellow amorphous material separates. This mixture is then heated to 80° C., chilled and filtered. The yield of 2-acetylpteroylglutamic acid is 0.23 g. of 91.2% purity according to chemical assay; biological assay was 71.1%.

The above condensation of the perbromide of 2-acetamino-4-hydroxy-6-methylpteridine with para-aminobenzoylglutamic acid in aqueous solution can be carried out at pH 3–4. At this pH, maintained either by use of sodium hydroxide or by the buffering action of acetic acid and sodium acetate, the purity of the product is consistently 80%–90% or higher.

*Example 2*

To 175 ml. of glacial acetic acid at steam bath temperature, is added 5.43 g. (0.025 mol) of 2-actylamino-4-hydroxy-6-methyl pteridine. Solution is complete at a temperature of about 87° C. The bromine, 1.28 ml. (0.025 mol) is added all at once with stirring. A flood light is turned on at close range so that the temperature gradually increased to 120° C. in 18 minutes. The product is collected by filtration, washed with acetic acid and ether, and dried. The perbromide of 2-acetylamino-4-hydroxy-6-methyl pteridine weighs 4.35 g.

One-half gram of the above product is condensed with 2.4 g. of p-aminobenzoylglutamic acid at pH 11 to give 0.25 g. of 2-acetylpteroylglutamic acid of 70.5% purity.

*Example 3*

To 175 ml. of glacial acetic acid, at steam bath temperature, is added 5.43 g. of 2-acetylamino-4-hydroxy-6-methyl pteridine (temperature about 82° C.). With vigorous stirring 1.28 ml. of bromine is added. The stirred mixture is heated on a steam bath at 94° C. for 2 hours and 45 minutes. The product is collected, washed with ether and dried; weight 5.2 g.

One-half gram of perbromide of 2-acetylamino-4-hydroxy-6-methyl pteridine obtained above is condensed with 2.4 g. of p-aminobenzoylglutamic acid at pH 11. A yield of 0.2 g. of 2-acetylpteroylglutamic acid of 51% purity is obtained.

*Example 4*

To a solution of 2.4 g. of p-aminobenzoylglutamic acid in 60 ml. of water at room temperature, with vigorous stirring maintaining the pH at 3.5–4, is added all at once 0.5 g. of the perbromide of 2-acetylamino-4-hydroxy-6-methyl pteridine. The red perbromide goes into solution slowly giving a yellow color and in twenty minutes the pale yellow crystalline product begins separating. It is stirred for 1½ hours and left overnight in the chill room. The product is filtered off, washed with alcohol and ether, and dried. The 2-acetylpteroylglutamic acid weighs 0.15 g. of 90.5% purity.

*Example 5*

A series of reactions are carried out using:

| | Weight, g. |
|---|---|
| (a) 1 equivalent of para-aminobenzoylglutamic acid | 0.35 |
| (b) 2 equivalents of para-aminobenzoylglutamic acid | 0.70 |
| (c) 3 equivalents of para-aminobenzoylglutamic acid | 1.05 |
| (d) 4.75 equivalents of para-aminobenzoylglutamic acid | 1.67 | in 60 ml. of water with vigorous stirring at room temperature maintaining the pH at 3–4 in which each is reacted with 0.5 g. of the perbromide of 2-acetylamino - 4 - hydroxy- 6 -methyl pteridine. The mixtures are each stirred for 1½ hours and left in the chill room overnight. The products are collected, washed with water, acetone and ether, and dried.

| Wt. of Product | Purity by Chemical Assay |
|---|---|
| | *Percent* |
| (a) 0.1 g | 79.7 |
| (b) 0.3 g | 86.0 |
| (c) 0.27 g | 81.2 |
| (d) 0.22 g | 76.0 |

Example 6

A series of 5 reactions are run at pH 11 using varied amounts of p-aminobenzoylglutamic acid. To the solution of p-amino-benzoylglutamic acid in 60 ml. of water at room temperature with vigorous stirring maintaining the pH at 11, is added, in small portions, 0.5 g. of the perbromide of 2-acetylamino-4-hydroxy-6-methyl pteridine. After one hour stirring at pH 11, the solution is brought to pH 3.5, heated to 80° C. and then cooled overnight. The product from each is collected, washed with acetone and ether, and dried.

| Equivalents of Para-amino-benzoylglutamic Acid | Weight of Para-amino benzoylglutamic Acid | Weight of Product | Purity of Chemical Assay |
|---|---|---|---|
| | | | Percent |
| (a) 1 | 0.35 | 0.25 | 62.2 |
| (b) 2 | 0.70 | 0.20 | 67.0 |
| (c) 3 | 1.05 | 0.27 | 50.5 |
| (d) 4.75 | 1.67 | 0.21 | 51.0 |
| (e) 6.82 | 2.40 | 0.25 | 51.5 |

Example 7

154.3 g. of 3-hydroxy-4-nitrobenzoic acid (Ber. 1887, 20, 405) is dissolved by refluxing in 660 cc. thionyl chloride for 70 minutes. The thionyl chloride in excess is concentrated off in vacuum, leaving the solid acid chloride residue. The residue is added to 1990 cc. of a water solution containing 252 g. of glutamic acid and 627 g. of sodium bicarbonate. The reaction is permitted to stir all night. After stirring about 15 hours the solution is clarified by filtering. The filtrate is heated to 70° C. and acidified with 550 cc. of concentrated hydrochloric acid, stirred a few minutes, and the heavy precipitate which forms is filtered off. This residue is recovered 3-hydroxy-4-nitrobenzoic acid. This last filtrate is cooled well and the 3-hydroxy-4-nitrobenzoylglutamic acid is filtered off. The product dried at 60° C., weighs 93 g. This product is reduced to the amine in 1860 cc. water at pH 3.0 with 190 g. of Zn—Cu couple. About 160 cc. of concentrated hydrochloric acid is used to maintain a constant pH. The temperature rose to about 60° C. during the reduction. The excess Zn—Cu is filtered off. Immediately the filtrate is reacted with 65.3 g. of the perbromide of 2-acetylamino-4-hydroxy-6-methyl pteridine in glacial acetic acid. The reaction is kept constant at pH 3.0 with 10 N sodium hydroxide. The condensation mixture is stirred for about 16 hours. The product is filtered and washed with a little water, ethanol and ether, and dried at 60° C., weight; 31.6 g.

The product obtained above is dissolved in 15 liters of 0.1 N sodium hydroxide. This solution is heated on the steam bath for one-half hour at 90° C. in order to hydrolyze the acetyl group. The product is treated with 50% lime by adding 139 cc. of a 30% calcium chloride solution. The temperature of this precipitation was carried out at 60° C. The calcium salt is filtered with diatomaceous earth and discarded. The zinc salt of the product is precipitated from this last filtrate by adding 50% zinc chloride solution until pH 6.8. This salt is filtered and sucked as dry as possible. The zinc cake is dissolved with concentrated hydrochloric acid and the solution is treated with activated carbon at 60° C. The filtrate is diluted to 1 N and the purified product precipitates out. The mixture is cooled at 25° C. and filtered, washed and dried at 60° C. This N-[4-{[(2-amino-4-hydroxy-6-pteridyl)methyl]amino}3'-hydroxybenzoyl]glutamic acid weights 8 g.

Example 8

To a solution of 7 g. of tetra-ethyl p-aminobenzoyl-alpha-glutamyl-alpha-glutamylglutamate in 40 ml. of ethanol and 20 ml. of water at pH 8-9 is added 0.5 g. of the perbromide of 2-acetylamino-4-hydroxy-6-methyl pteridine in small portions maintaining the pH at 8-9. The product, tetra-ethyl-2-acetylpteroyl-alpha-glutamyl-alpha-glutamylglutamate, is isolated by a procedure similar to that for 2-acetylpteroylglutamic acid in Example 1.

Example 9

To a solution of 32 g. of p-aminobenzamide in 600 ml. of water is added 50 g. of the perbromide of 2-acetylamino-4-hydroxy-6-methylpteridine maintaining the pH at 3 to 4. After stirring for one hour 14 g. of 2-acetylpteramide of 68.5% purity is obtained.

We claim:

1. A method which comprises reacting together the perbromide of a 2-acylamino-4-hydroxy-6-methyl pteridine and a member of the group consisting of an aminobenzoic acid and amides thereof, whereby compounds having the general formula:

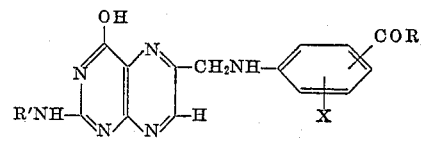

in which R' is an acyl radical, X is a member of the group consisting of hydrogen and hydroxyl and R is a member of the group consisting of hydroxyl, amino and substituted amino radicals are produced and recovered.

2. A method which comprises reacting together the perbromide of 2-acetylamino-4-hydroxy-6-methyl pteridine and a member of the group consisting of an aminobenzoic acid and amides thereof, whereby compounds having the general formula:

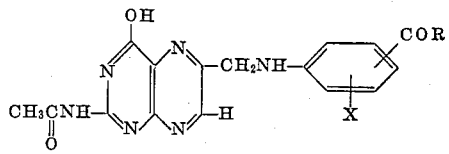

in which X is a member of the group consisting of hydrogen and hydroxyl radicals and R is a member of the group consisting of hydroxyl, amino and substituted amino radicals are produced and recovered.

3. A method which comprises reacting together the perbromide of a 2-acylamino-4-hydroxy-6-methyl pteridine and an amino acid amide of aminobenzoic acid whereby compounds having the general formula:

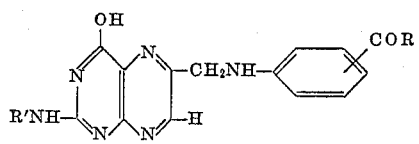

in which R' is an acyl radical and R is the radical of an amino acid being attached to the carbonyl group by an amide linkage are produced and recovered.

4. A method which comprises reacting together the perbromide of a 2-acylamino-4-hydroxy-6-methyl pteridine and para-aminobenzoyl-glutamic acid whereby 2-acylaminopteroylglutamic acid is produced and recovered.

5. A method which comprises the step of reacting together the perbromide of 2-acetylamino-4-hydroxy-6-methyl pteridine and para-aminobenzoylglutamic acid whereby 2-acetylpteroylglutamic acid is produced and recovered.

6. A method which comprises reacting together the perbromide of 2-acetylamino-4-hydroxy-6-methyl pteridine and 3-hydroxy-4-aminobenzoylglutamic acid, hydrolyzing the resulting reaction product to remove the acetyl radical, whereby N-[4-{[2-amino-4-hydroxy-6-pteridyl)methyl]amino}3′-hydroxybenzoyl]glutamic acid is produced and recovered.

7. A method which comprises reacting together the perbromide of 2-acetylamino-4-hydroxy-6-methyl pteridine and para-aminobenzoylglutamic acid, hydrolyzing the resulting reaction product to remove the acetyl radical whereby pteroylglutamic acid is produced and recovered.

8. A method which comprises reacting together the perbromide of 2-acetylamino-4-hydroxy-6-methyl pteridine and tetraethyl para-aminobenzoyl-alpha-glutamyl-alpha-glutamylglutamate, whereby tetra-ethyl-2-acetylpteroyl-alpha-glutamyl-alpha-glutamylglutamate is produced and recovered.

9. N-[4-{[2-amino-4-hydroxy-6-pteridyl)-methyl]amino}3′-hydroxybenzoyl]glutamic acid.

ANGELA A. GOLDMAN.
COY W. WALLER.

REFERENCES CITED

The following references are of record in the file of this patent:

Richter: Textbook of Organic Chemistry, p. 476 (1938 edition).